United States Patent
Fleischer, deceased

[15] 3,659,808
[45] May 2, 1972

[54] ONE WAY DRIVE FOR FISHING REELS

[72] Inventor: Oscar Fleischer, deceased, late of 2610 S. W. 21st Street, Miami, Fla. by Helen Krohn Fleischer, executrix

[22] Filed: Oct. 27, 1969

[21] Appl. No.: 869,489

[52] U.S. Cl. .......... 242/219, 74/576, 188/82.1, 188/82.8, 242/84.1 R
[51] Int. Cl. .......... A01k 89/02, F16d 63/00
[58] Field of Search .......... 242/84.44, 84.45, 84.46, 84.54; 188/82.1, 82.8; 74/576, 578

[56] References Cited

UNITED STATES PATENTS

| 115,129 | 5/1871 | Spore | 188/82.8 X |
| 1,128,797 | 2/1915 | Lindsey | 188/82.8 |
| 1,239,265 | 9/1917 | Grant | 74/578 X |
| 2,354,530 | 7/1944 | McMahon | 242/84.44 |
| 3,428,268 | 2/1969 | Fleischer | 242/84.45 |

Primary Examiner—Billy S. Taylor
Attorney—Salvatore G. Militana

[57] ABSTRACT

A one way drive for fishing reels to prevent the inadvertent reverse rotation of the spool operating handle having an arcuate gear section with teeth normally in engagement with the spool rotating gear which permits the rotation of the latter in the direction to wind the fishing line on the spool but prevents the reverse rotation of the operating handle.

3 Claims, 7 Drawing Figures

Patented May 2, 1972 3,659,808

INVENTOR
OSCAR FLEISCHER
BY
Salvatore G. Militana,
ATTORNEY

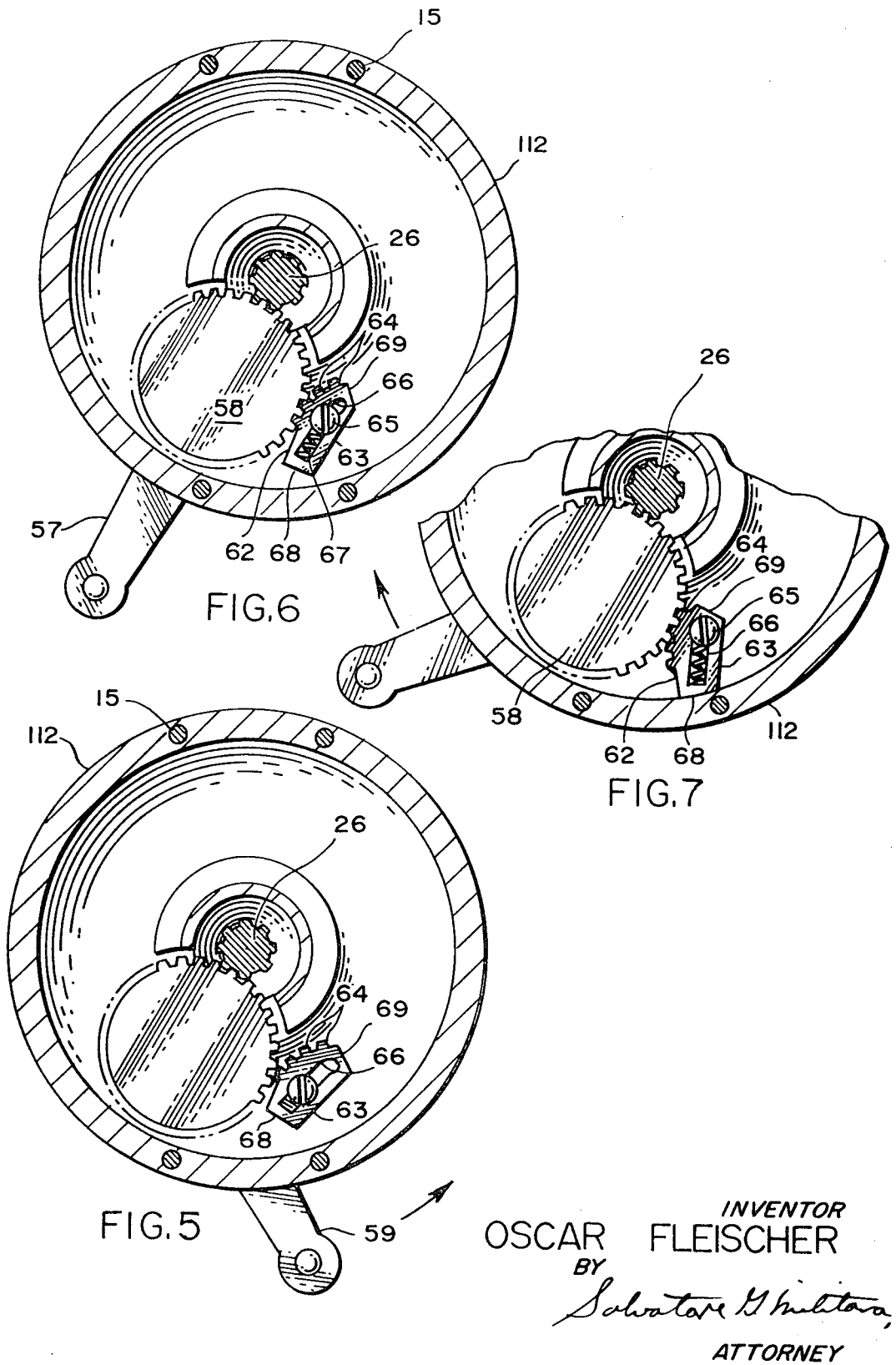

ONE WAY DRIVE FOR FISHING REELS

This invention relates to a one way drive for fishing reels.

At the present time the conventional fishing reels are provided with a pawl and ratchet mechanism for preventing the reverse rotation of the operating handle and the spool. With the use of a pawl and ratchet in a fishing reel there is always a danger of shearing a tooth either on the pawl or on the ratchet since only one tooth on the ratchet engages the pawl which operates as a meshed tooth that permits the gear to which the ratchet is fastened to rotate in one direction only. Also, there is not complete assurance that the pawl and ratchet are in engagement at all times and if out of engagement, the operating lever will rotate in the reverse or spool unwinding direction. The present invention contemplates avoiding the use of a pawl and ratchet mechanism but utilizes instead an arcuate gear section that removes the danger of shearing teeth and the possibility of the operating handle and spool rotating in the wrong direction.

Therefore, it is a principal object of the present invention to provide a one way drive mechanism for fishing reels which is positive in operation and always in meshed gear relation with the drive gear so that the spool cannot be rotated by the operating handle in the wrong or fishing line-unwinding direction.

Another object of the present invention is to provide a fishing reel with a one way drive mechanism consisting of an arcuate gear section which has a plurality of teeth in mesh engagement with the drive gear when an attempt is made to rotate the operating handle in the reverse direction so that the danger of shearing the teeth of the drive gear is remote if at all possible.

A further object of the present invention is to provide a fishing reel with a one way drive mechanism which eliminates the need for a ratchet and pawl mechanism thereby being simpler in construction, less expensive in initial cost and in replacement of parts as well as being easier to operate with a minimum of parts resulting in a smaller space being required and accomplishing a more efficient function.

A still further object of the present invention is to provide a fishing reel with a one way drive mechanism consisting of an arcuate gear section slidably fastened to an end casing and in mesh engagement with the drive gear wherein there is very little strain on the fastening member at any time.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

Figure 3:
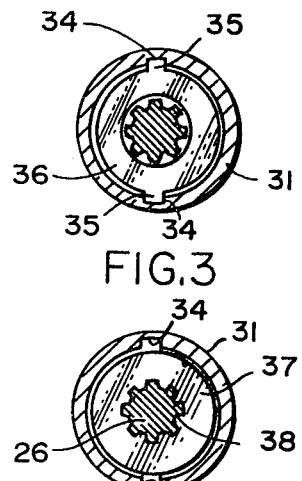
Figure 4:
Figure 2:
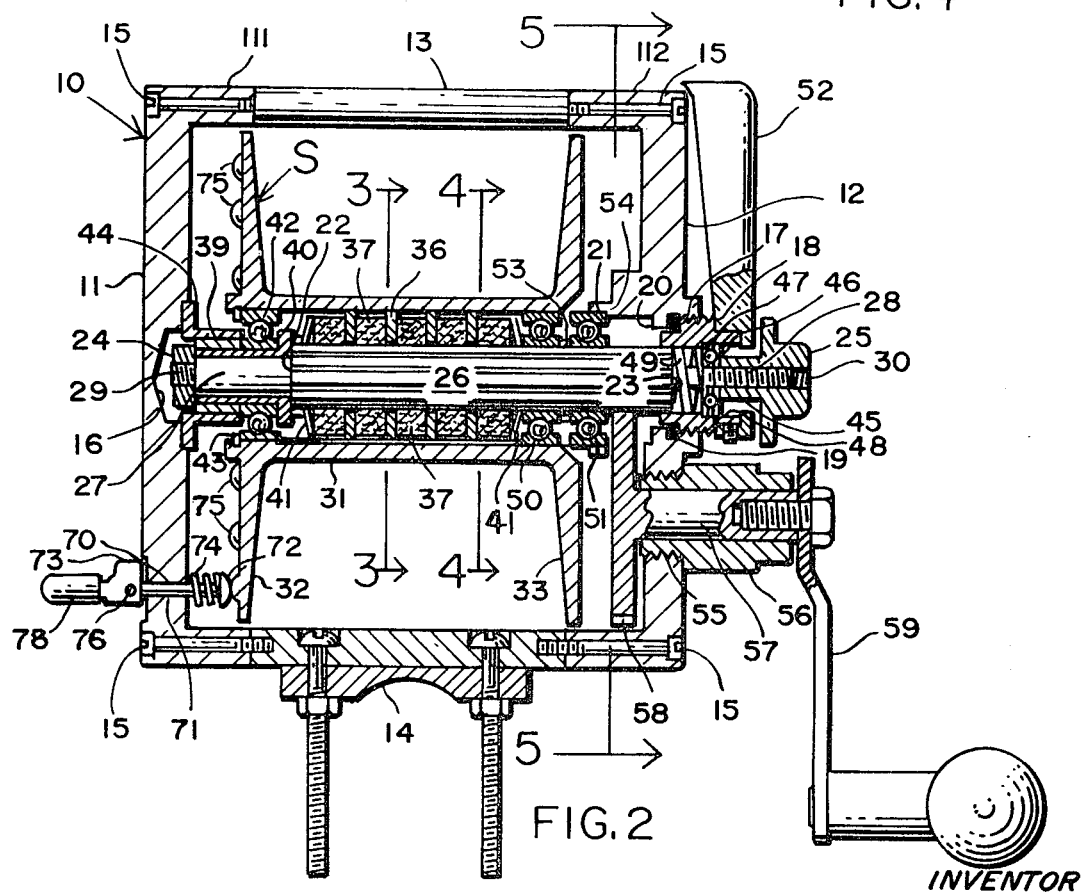
FIG. 2 is a cross sectional view taken along the line 2—2 of FIG. 1.

FIGS. 3 and 4 are detailed cross sectional views taken along the lines 3—3 and 4—4 respectively of FIG. 2.

FIG. 5 is a cross sectional view taken along the line 5—5 of FIG. 2 showing the position of the arcuate gear section when the drive gear is being rotated by the operating handle.

FIGS. 6 and 7 are similar to FIG. 5 showing the position of the arcuate gear section taken to prevent the reverse rotation of the drive gear.

Referring to the drawings wherein like numerals are used to designate similar parts throughout the several views, the numeral 10 refers to my fishing reel having a casing 11 at one end and a casing 12 at the other end, the casings 11 and 12 being joined together by cross members 13 and reel seat 14 all of which extend between the rim portions 111 and 112 of the end casings 11 and 12 and secured thereto by screws 15. In addition there is a rotatable shaft 26 extending between the end casings 11 and 12 at the axes thereof extending through bores 16 and 17 in the end casings 11 and 12 respectively. The bore 16 in the end casing 11 is a blind bore extending from the inner surface of the casing 11 while the bore 17 is threaded to receive a brake adjusting sleeve 18 to which an operating lever 52 is secured as is explained in detail hereinafter. An O-ring 19 is positioned between the inner end of the threaded sleeve 18 and a shoulder 20 formed about the periphery of the bore 17 at the position of the threaded portion with the inner portion of the bore 17 being smooth as at 21.

The shaft 26 is splined along most of its length having reduced diameters forming shoulders 22 and 23 at its ends 27 and 28 with the extreme end portions being threaded as at 29 and 30 to receive nuts. Mounted on the shaft 26 is a line receiving spool S consisting of a pair of flanges 32 and 33 having a hub 31 disposed therebetween with the splined shaft 26 extending axially of the hub 31 and in spaced relation thereto. The inner surface of the hub 31 is provided with a pair of oppositely positioned slots 34 extending longitudinally thereof. The slots 34 receive lugs 35 formed on drive discs 36 that are rotatably mounted on the splined shaft 26. Alternately positioned on the splined shaft 26 between the drive discs 36 are brake discs 37 made of asbestos and the like rigidly mounted to rotate with the splined shaft 26 by means of their slotted center portion 38 interengaging with the splined shaft 26. The brake discs 37 are slightly smaller in diameter than the inside diameter of the hub 31 so that there is no contact or engagement by the brake discs 37 and the hub 31.

At the end 27 of the shaft 26 is spacer sleeve 39 extending from the nut 24 and having a flange 40 engaging the shoulder 22 of the shaft 26. A spring member 41 extends between the flange 40 and the first brake disc 37 at one end of the splined shaft 26 and between a bearing race 50 and end brake disc 37 at the other end. A ball bearing race 42 is keyed to the end of the hub 31 as at 43 and mounted on the sleeve 39 permitting relative rotation of the hub 31 and shaft 26. The end of the spacer sleeve 39 is received by a socket 44 fastened to the end casing 11 at the position of the bore 16.

At the other end 30 of the splined shaft 26, the nut 25 which is provided with a spacer portion 45 engages a bearing race 46 mounted in a recess 48. The bearing 46 engages a shoulder 47 formed in the recess 48. A coil spring 49 mounted about the shaft end 28 and extends between the shoulder 23 of the splined shaft 26 and the bearing race 46. At the position of the hub flange 33 is a pair of bearing races 50 and 51 spaced apart by a washer 53, the races 50 and 51 rotatably supporting the spool S on the shaft 26. The bearing race 51 engages a shoulder 54 formed in the smooth bore 21 of the end casing 12.

In the end casing 12 there is a second threaded bore 55 in which a spacer sleeve 56 is threadedly mounted. Rotatably mounted in the spacer sleeve 56 is a shaft 57 having a gear 58 mounted at its inner end, which gear 58 is in mesh engagement with the splined shaft 26. At the outer end of the shaft 57 is an operating handle 59.

Figure 1:
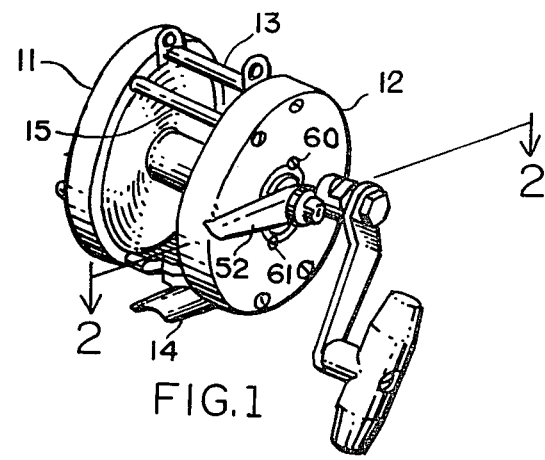
FIG. 1 is a perspective view of a fishing reel constructed in accordance with my invention.

As is noted from the above description taken in connection with the drawings, in particular FIGS. 1–4 inclusive, upon rotating the operating handle 59 in a clockwise direction as viewed in FIG. 1, the gear 58 will cause the splined shaft 26 to rotate causing the brake discs 37 to rotate therewith since their inner portions are slotted as at 38 to receive the splines of the shaft 26. The spool S will likewise rotate if the drive discs 36 whose lugs 35 are received in slots 34 in the hub 31 are in frictional engagement with the brake discs 37. The amount of frictional engagement between the drive discs 36 and brake discs 37 is determined by the position of the brake operating lever 52. Upon swinging the brake operating lever 52 from one limit post 60 to the other limit post 61, the sleeve 18 will thread outwardly of the threaded bore 17 causing the shaft 26 to move or slide axially in the direction away from the end casing 11 and toward the end casing 12. The flange 40 of the sleeve 39 in moving with the shaft 26 forces the drive discs 36 and brake discs 37 into greater frictional engagement since the bearings 50, 51 cannot move axially due to the bearing 51 being in engagement with the shoulder 54 in the end casing 12. The amount of frictional engagement between the drive discs 36 and brake discs 37 determine the amount of drag which is the force required by a fish or any other object tugging on a line wound about the spool S to cause the spool S to rotate in a reverse direction so as to unwind line from the spool S. However, the spool S alone will rotate in the reverse direction since mechanism to be described hereinafter prevents the reverse rotation of the splined shaft 26.

The above construction of my reel 10 including the brake mechanism is described in greater detail and claimed in my copending application serial number 883,097 filed on Dec. 8, 1969 entitled Brake Mechanism for Fishing Reels and shown and described in the present application in order to understand my improved one way drive mechanism.

To prevent the reverse rotation of the gear 58 and the shaft 26, I provide an arcuate gear section 63 having one side partially smooth as at 62 and partially occupied by a plurality of gear teeth 64 that is in mesh engagement with the teeth of the gear 58. The arcuate gear section 63 is movably mounted on the inner surface of the end casing 12 by a large headed screw 65 received in an elongated arcuate slot 66 formed in the gear section 63. A coil spring 67 is positioned in the arcuate slot 66 and extends between the screw 65 and the lower end portion 68 of the arcuate gear section 63 and yieldingly urging the arcuate gear section 63 to slide downwardly with the screw 65 engaging the upper end portion 69 and the lower end portion 68 engaging the rim 112 of the end casing 12.

When the operating lever 59 is actuated to rotate the spool S for winding the fishing line thereon, the gear 58 will rotate in a counter clockwise direction as viewed in FIGS. 5–7 and engage the teeth 64 of the arcuate gear section 63 to slide the latter upwardly against the spring pressure 67 to the position as shown by FIG. 5. When the operating lever 59 has stopped rotating, the force of the coil spring 67 will cause the arcuate gear section 63 to slide downwardly until at least one of the teeth 64 or more, as shown by FIG. 6, is in mesh engagement with the teeth of the gear 58. If the handle 59 is reversed in rotation, that is if an attempt is made to rotate the handle 59 in a counter-clockwise direction as viewed in FIG. 1, which would tend to rotate the gear 58 in a clockwise direction as viewed by FIGS. 5–7, the meshed teeth of the gear 58 and arcuate gear section 63 will cause the arcuate gear section 63 to slide downwardly along the screw 65 until the end 68 of the arcuate gear section 63 engages the rim 112 at which time at least three teeth of the two gears 58 and 63 are in mesh engagement to prevent any further rotation of the gear 58. Consequently the arcuate gear section 63 prevents any reverse rotation of the operating handle 59 without affecting or inhibiting in any manner the rotation of the operating handle 59, gear 58 and spool S to wind the fishing line on the spool S. The unwinding of fishing line from the spool S can only be effected by the pull of a fish tugging on the fishing line as it exceeds the amount of drag placed on the spool S as explained in detail hereinabove.

On the end casing 11 there is a clicker device consisting of a pin 70 extending through a bore 71 in the end casing 11 with a rounded cap portion 72 mounted on one end and a pivoted cam member 73 pivoted by a pin 76 to the outer end of the pin 71. A spring 74 extending between the inner surface of the end casing 11 and the cap portion 72 urges the latter toward a plurality of dimples 75 formed in a circle on the side wall of the flange 32 of the spool S. With the cam member 73 positioned as shown in solid lines by FIG. 2, the rounded cap portion 72 will engage the dimples 75 as the spool S rotates to make a clicking noise. Upon pivoting the cam member 73 about the pivot pin 76 so as to lie prone against the outside surface of the end casing 11, the rounded cap portion 72 will slide away from the dimpled flange 32 against the spring pressure 74 so that there will now be no clicking noise as the spool S rotates. The extended position of the cam member 73 indicates to the user that the clicker is in the "on" position while when the cam member is lying along the end casing 11, it is indicated that the clicker is off.

What I claim as new and desire to secure by Letters Patent of the United States is:

1. A one way drive for fishing reels having a spool means rotatably mounted in a casing, said casing having a shoulder means, a gear operatively engaging said spool means for rotating said spool means in one direction, stop means engaging said gear preventing the reverse rotation of said gear, said stop means comprising an elongated member having an arcuate slotted portion, fastening means extending through said arcuate slotted portion slidably mounting said elongated member adjacent said gear, said elongated member having an arcuate side portion, a plurality of teeth in mesh engagement with said gear formed on said arcuate side portion and extending from one end of said elongated member and terminating adjacent the other end of said arcuate side portion, and spring means mounted in said slotted portion and extending between said fastening means and said other end of said elongated member yieldingly urging said teeth into engagement with said gear, whereby upon the rotation of said gear and said spool in one direction, said elongated member slides in a direction against said spring means, said gear abutting against the tooth adjacent said other end of said arcuate side portion and upon the reverse rotation of said gear, said spring means causing said elongated member to slide and effect the meshing of said gear with said teeth and said other end of said elongated member engaging said shoulder means to prevent the reverse rotation of said gear and said spool.

2. The structure as recited by claim 1 wherein said casing comprises a substantially circular end casing and said shoulder means being a rim portion extending about said end casing.

3. In a device of the type having a support, a shaft rotatably supported at each end by said support, and a spool having an axial bore therethrough rotatably mounted on said shaft, and driving means operatively connected to said shaft and adapted to revolve said shaft in two directions of rotation, said driving means including a gear keyed for rotation with said driving means, and a means engaging said gear limiting rotation of said driving means to one direction of rotation, the improvement in said means engaging said driving means which resides in providing arcuate gear section means engaging said gear and slidably mounted on a projection from a stationary portion of said device, said arcuate gear section means being toothed adjacent one end thereof and toothless adjacent the other end thereof and having an elongated slot longitudinally disposed therein in a direction parallel to the direction of engagement of said gears, the other end normally being disposed in abutting engagement with said stationary portion of said device, and a tension spring disposed in said slot with one end thereof abutting a wall of said slot and the other end thereof abutting said projection, whereby rotation of said driving means is restrained from rotation in one direction and movement of said arcuate gear section means relative to said projection is limited by said tension spring when said driving means is rotated in the other direction of rotation.

* * * * *